(12) United States Patent
Kouka et al.

(10) Patent No.: US 11,804,631 B2
(45) Date of Patent: Oct. 31, 2023

(54) ADHESIVE, LAMINATE OBTAINED USING SAME, BATTERY CASE MATERIAL, AND BATTERY CASE AND PRODUCTION METHOD THEREFOR

(71) Applicant: SHOWA DENKO K.K., Tokyo (JP)

(72) Inventors: Hiroto Kouka, Himeji (JP); Yasuhiro Nakagawa, Kakogawa (JP)

(73) Assignee: Resonac Corporation, Tokyo (JP)

( * ) Notice: Subject to any disclaimer, the term of this patent is extended or adjusted under 35 U.S.C. 154(b) by 988 days.

(21) Appl. No.: 16/470,625

(22) PCT Filed: Sep. 19, 2017

(86) PCT No.: PCT/JP2017/033756
§ 371 (c)(1),
(2) Date: Jun. 18, 2019

(87) PCT Pub. No.: WO2018/116555
PCT Pub. Date: Jun. 28, 2018

(65) Prior Publication Data
US 2019/0326564 A1    Oct. 24, 2019

(30) Foreign Application Priority Data
Dec. 22, 2016  (JP) .................................. 2016-249037

(51) Int. Cl.
| | |
|---|---|
| *C08G 18/62* | (2006.01) |
| *C08G 18/73* | (2006.01) |
| *C08G 18/75* | (2006.01) |
| *C08G 18/76* | (2006.01) |
| *C08G 18/72* | (2006.01) |
| *C08G 18/22* | (2006.01) |
| *C08G 18/24* | (2006.01) |
| *C09J 175/04* | (2006.01) |
| *B32B 15/20* | (2006.01) |
| *B32B 15/085* | (2006.01) |
| *B32B 15/095* | (2006.01) |
| *B32B 7/12* | (2006.01) |
| *B32B 27/36* | (2006.01) |
| *H01M 50/124* | (2021.01) |
| *H01M 50/105* | (2021.01) |
| *H01M 50/10* | (2021.01) |

(52) U.S. Cl.
CPC ............. *H01M 50/124* (2021.01); *B32B 7/12* (2013.01); *B32B 15/085* (2013.01); *B32B 15/095* (2013.01); *B32B 15/20* (2013.01); *B32B 27/36* (2013.01); *C08G 18/222* (2013.01); *C08G 18/246* (2013.01); *C08G 18/6204* (2013.01); *C08G 18/722* (2013.01); *C08G 18/73* (2013.01); *C08G 18/755* (2013.01); *C08G 18/7664* (2013.01); *C09J 175/04* (2013.01); *H01M 50/10* (2021.01); *H01M 50/105* (2021.01); *B32B 2457/10* (2013.01)

(58) Field of Classification Search
CPC ....... B32B 7/12; B32B 15/085; B32B 15/095; B32B 15/20; B32B 27/36; B32B 2457/10; C08G 18/222; C08G 18/246; C08G 18/6204; C08G 18/722; C08G 18/73; C08G 18/755; C08G 18/7664; C09J 175/04

See application file for complete search history.

(56) References Cited

U.S. PATENT DOCUMENTS

| | | | |
|---|---|---|---|
| 2015/0367601 A1 | 12/2015 | Ando et al. | |
| 2017/0207427 A1 | 7/2017 | Kouka et al. | |

FOREIGN PATENT DOCUMENTS

| | | | |
|---|---|---|---|
| CN | 104903416 A | | 9/2015 |
| JP | 2010-092703 A | | 4/2010 |
| JP | 2014-120277 A | | 6/2014 |
| JP | 2014120277 A | * | 6/2014 |
| JP | 2016-124876 A | | 7/2016 |
| JP | 2016184546 A | | 10/2016 |
| WO | 2013/114934 A1 | | 8/2013 |
| WO | 2016/021279 A1 | | 2/2016 |
| WO | 2016/199551 A1 | | 12/2016 |
| WO | 2017/134931 A1 | | 8/2017 |

OTHER PUBLICATIONS

[NPL-1] Horiguchi (JP 2014-120277 A); Jun. 2014 (EPO machine translation). (Year: 2014).*
International Search Report of PCT/JP2017/033756 dated Nov. 7, 2017.
Communication dated Aug. 27, 2020 from The China National Intellectual Property Administration in Application No. 201780077067. 7.

* cited by examiner

*Primary Examiner* — David Sample
*Assistant Examiner* — Donald M Flores, Jr.

(57) ABSTRACT

As an adhesive for the lamination of metal foil and a resin film, an adhesive that can stably exhibit good adhesiveness and moreover can provide a laminate having better electrolytic solution resistance and heat resistance is provided. An adhesive comprising a polyolefin resin (A) having a carboxyl group; and polyisocyanate compounds (B), wherein the polyisocyanate compounds (B) comprise a polymer of a saturated aliphatic polyisocyanate (B1), a polymer of a saturated alicyclic polyisocyanate (B2), and a polymer of an aromatic polyisocyanate (B3).

15 Claims, No Drawings

ADHESIVE, LAMINATE OBTAINED USING SAME, BATTERY CASE MATERIAL, AND BATTERY CASE AND PRODUCTION METHOD THEREFOR

CROSS REFERENCE TO RELATED APPLICATIONS

This application is a National Stage of International Application No. PCT/JP2017/033756 filed Sep. 19, 2017, claiming priority based on Japanese Patent Application No. 2016-249037 filed Dec. 22, 2016.

TECHNICAL FIELD

The present invention relates to an adhesive for the lamination of metal foil and a resin film that can be preferably used for the exterior material of a secondary battery such as a lithium ion battery, a laminate using the adhesive, a battery exterior material, and a battery case and a method for producing the same.

BACKGROUND ART

Lithium ion batteries are secondary batteries having high energy density and being compact and lightweight, and therefore are widely used for the power supplies of mobile electronic equipment such as notebook computers, smartphones, and tablet terminals, electric cars, and the like.

For the battery case of a lithium ion battery, an exterior material having high sealability against the electrolyte, the separator, and the like that are battery materials is used in order to prevent the leakage of the electrolytic solution and the entry of water into the interior of the battery.

As the exterior material, generally, a laminate in which an outer layer comprising a heat-resistant resin film, an intermediate layer having water vapor barrier properties such as aluminum foil, and an inner layer comprising a polyolefin resin film or the like having electrolytic solution resistance are sequentially laminated is used. In such a laminate, it is required that the layers are adhered and integrated with each other using an adhesive having high adhesive strength, in order to provide an exterior material having high sealability.

Regarding the adhesive as described above, for example, PTL1 and PTL2 each describe a packaging material for a battery case in which layers are adhered via an adhesive layer containing a polyolefin resin having a carboxyl group in which polypropylene or the like is graft-modified with an unsaturated carboxylic acid or an acid anhydride thereof, and an isocyanate compound.

CITATION LIST

Patent Literature

PTL1: JP 2010-92703 A
PTL2: WO 2013/114934 A

SUMMARY OF INVENTION

Technical Problem

However, the modified polyolefin resins used in the adhesive layers described in the above PTL1 and PTL2 are easily influenced by fluctuations in the water content of the adhesives due to humidity, the thicknesses of the layers of the laminates, and the like, in the application and aging of the adhesives. In addition, for the adhesives described in the above PTL1 and PTL2, only those using specifically only one type, hexamethylene diisocyanate or a polymer thereof, as the isocyanate compound are disclosed. With such adhesives, it is difficult to obtain stable adhesiveness, and the electrolytic solution resistance and heat resistance of the laminates cannot always be said to be sufficient.

Therefore, an adhesive used for a battery exterior material is required to be able to exhibit good adhesiveness and provide a laminate having better electrolytic solution resistance and heat resistance.

The present invention has been made in order to solve the above problems, and it is an object of the present invention to provide, as an adhesive for the lamination of metal foil and a resin film, an adhesive that can stably exhibit good adhesiveness and moreover can provide a laminate having better electrolytic solution resistance and heat resistance.

It is also an object of the present invention to provide a laminate excellent in electrolytic solution resistance and heat resistance, a battery exterior material, and a battery case and a method for producing the same.

Solution to Problem

In an adhesive comprising a polyolefin resin and a isocyanate compound, attention has been paid to the type of the isocyanate compound, and it has been found that by using a plurality of particular types of isocyanate compounds, good adhesiveness is obtained, and the electrolytic solution resistance and heat resistance of a laminate can be improved, in the lamination of metal foil and a resin film. The present invention is based on the finding.

Specifically, the present invention provides the following [1] to [16].

[1] An adhesive for lamination of metal foil and a resin film, comprising a polyolefin resin (A) having a carboxyl group; and polyisocyanate compounds (B), wherein the polyisocyanate compounds (B) comprise a polymer of a saturated aliphatic polyisocyanate (B1), a polymer of a saturated alicyclic polyisocyanate (B2), and a polymer of an aromatic polyisocyanate (B3).

[2] The adhesive according to the above [1], wherein the polymer of the saturated aliphatic polyisocyanate (B1) comprises one or more selected from the group consisting of an allophanate polymer of a saturated aliphatic polyisocyanate and an isocyanurate of a saturated aliphatic polyisocyanate.

[3] The adhesive according to the above [1] or [2], wherein the polymer of the saturated alicyclic polyisocyanate (B2) comprises one or more selected from the group consisting of an allophanate polymer of a saturated alicyclic polyisocyanate and an isocyanurate of a saturated alicyclic polyisocyanate.

[4] The adhesive according to any one of the above [1] to [3], wherein the polymer of the aromatic polyisocyanate (B3) comprises one or more selected from the group consisting of an allophanate polymer of an aromatic polyisocyanate, an isocyanurate of an aromatic polyisocyanate, and polymethylene polyphenyl polyisocyanate.

[5] The adhesive according to any one of the above [1] to [4], wherein a molar ratio of isocyanato groups of the polymer of the saturated aliphatic polyisocyanate (B1), the polymer of the saturated alicyclic polyisocyanate (B2), and the polymer of the aromatic polyisocyanate (B3) is 3 to 20:1 to 6:1.

[6] The adhesive according to any one of the above [1] to [5], wherein the polyolefin resin (A) comprises one or more monomer units selected from the group consisting of propylene, ethylene, and butene.

[7] The adhesive according to any one of the above [1] to [6], wherein the polyolefin resin (A) comprises a polyolefin resin modified with one or more selected from the group consisting of an ethylenic unsaturated carboxylic acid or an acid anhydride thereof.

[8] The adhesive according to any one of the above [1] to [7], wherein the polyolefin resin (A) has a melt mass-flow rate of 2 to 50 g/10 min measured at a temperature of 130° C. and a load of 2.16 kg in accordance with JIS K 7210-1: 2014.

[9] The adhesive according to any one of the above [1] to [8], wherein a molar ratio of isocyanato groups of the polyisocyanate compounds (B) to 1 mol of the carboxyl groups of the polyolefin resin (A) is 0.3 to 30.

[10] The adhesive according to any one of the above [1] to [9], further comprising a metal carboxylate (C).

[11] A laminate wherein metal foil and a resin film are laminated using the adhesive according to any one of the above [1] to [10].

[12] The laminate according to the above [11], wherein the metal foil is aluminum foil, and the resin film is a heat-sealable resin film.

[13] The laminate according to the above [11] or [12], wherein a thickness of the metal foil is 10 to 100 μm, and a thickness of the resin film is 9 to 100 μm.

[14] A battery exterior material wherein the laminate according to any one of the above [11] to [13] is used.

[15] A battery case wherein the battery exterior material according to the above [14] is used.

[16] A method for producing a battery case, comprising a step of shaping the battery exterior material according to the above [14] by deep drawing or bulging.

Advantageous Effects of Invention

According to the adhesive of the present invention, good adhesiveness can be stably exhibited, and a laminate excellent in electrolytic solution resistance and heat resistance can be obtained, in the lamination of metal foil and a resin film. Therefore, a laminate formed using the adhesive is good in the adhesiveness of the layers, excellent in electrolytic solution resistance and heat resistance, and preferred for a battery exterior material.

Therefore, a battery case using such a battery exterior material can also contribute to the production of a safe secondary battery having long life.

DESCRIPTION OF EMBODIMENTS

The present invention will be described in detail below.
The description of the numerical value range "x to y" herein means "x or more and y or less". A "(meth)acrylate" refers to any one or more of an acrylate and a methacrylate. A "monomer unit" refers to a raw material monomer when a resin is obtained by polymerization.

[Adhesive]

The adhesive of the present invention is an adhesive for the lamination of metal foil and a resin film. The adhesive of the present invention is characterized in that it comprises a polyolefin resin (A) having a carboxyl group; and polyisocyanate compounds (B), and the polyisocyanate compounds (B) comprise a polymer of a saturated aliphatic polyisocyanate (B1), a polymer of a saturated alicyclic polyisocyanate (B2), and a polymer of an aromatic polyisocyanate (B3).

By using the plurality of predetermined types as described above, as polyisocyanate compounds that are curing agents, in combination with a polyolefin resin having a carboxyl group that is the basis of an adhesive, adhesiveness can be improved, and a laminate excellent in electrolytic solution resistance and heat resistance can be obtained, in the lamination of metal foil and a resin film.

(Polyolefin Resin (A))

The polyolefin resin (A) that is a constituent of the adhesive of the present invention is not particularly limited as long as it is a polyolefin resin having a carboxyl group.

Examples of the monomer unit of the polyolefin skeleton in the polyolefin resin (A) include monoolefins such as ethylene, propylene, butene, pentene, hexene, heptene, octene, and 4-methyl-1-pentene; alicyclic olefins such as cyclopentene and cyclohexene; and chain or cyclic polyenes such as 1,4-hexadiene, 1,5-hexadiene, divinylbenzene, 1,3-cyclopentadiene, 1,3-cyclohexadiene, and 5-vinyl-2-norbornene. One of these may be used singly, or two or more of these may be used in combination. Among these, ethylene, propylene, and butene are preferred from the viewpoint of adhesiveness to a resin film, particularly a polyolefin resin film, that is an adherend.

The carboxyl group that the polyolefin resin (A) has, that is, the carboxyl group that is a substituent bonded to the polyolefin, may be derived from a carboxylic acid or a carboxylic anhydride.

Examples of the polyolefin resin (A) having a carboxyl group include modified polyolefin resins. Examples of such modified polyolefin resins include a graft polymer obtained by graft-polymerizing a monomer having a carboxyl group onto a polyolefin, a copolymer of a monomer having a carboxyl group and an olefin, and one having a site of the graft polymer and a site of the copolymer.

Examples of the monomer having a carboxyl group used for the modified polyolefin resins as described above include ethylenic unsaturated carboxylic acids such as (meth)acrylic acid; ethylenic unsaturated carboxylic anhydrides such as maleic anhydride, citraconic anhydride, and itaconic anhydride; and carboxyl group-containing ethylenic unsaturated carboxylates such as β-carboxyethyl (meth)acrylate. One of these may be used singly, or two or more of these may be used in combination. Among these, ethylenic unsaturated carboxylic acids or acid anhydrides thereof are preferred, especially ethylenic unsaturated carboxylic anhydrides are more preferred, and further preferably maleic anhydride is used.

The polyolefin resin (A) is a polyolefin resin having a carboxyl group but may comprise an ethylenic unsaturated carboxylate having no carboxyl group as a monomer unit constituting the polyolefin resin. Examples of the ethylenic unsaturated carboxylate having no carboxyl group include esterified products of (meth)acrylic acid and alcohols having 1 to 20 carbon atoms and having no carboxyl group and include methyl (meth)acrylate, ethyl (meth)acrylate, propyl (meth)acrylate, butyl (meth)acrylate, hexyl (meth)acrylate, octyl (meth)acrylate, decyl (meth)acrylate, dodecyl (meth)acrylate, lauryl (meth)acrylate, and stearyl (meth)acrylate. One of these may be used singly, or two or more of these may be used in combination.

The polyolefin resin (A) preferably has a melt mass-flow rate (MFR) of 2 to 50 g/10 min measured under the conditions of a temperature of 130° C. and a load of 2.16 kg in accordance with JIS K 7210-1: 2014. The MFR is more preferably 3 to 45 g/10 min, further preferably 8 to 40 g/10 min.

When the MFR is 2 g/10 min or more, the adhesiveness of an adhesive layer formed of the adhesive is less likely to decrease even when the adhesive layer comes into contact with an electrolytic solution, which is preferred. When the MFR is 50 g/10 min or less, the coating properties of the adhesive are good.

The acid value of the polyolefin resin (A) is an indicator of the content of carboxyl groups and preferably 3 to 60 mg KOH/g, more preferably 4 to 30 mg KOH/g, and further preferably 5 to 15 mg KOH/g from the viewpoint of the adhesiveness of the adhesive.

When the acid value is 3 mg KOH/g or more, the adhesiveness of an adhesive layer formed of the adhesive is less likely to decrease even when the adhesive layer comes into contact with an electrolytic solution, which is preferred. When the acid value is 60 mg KOH/g or less, the coating properties of the adhesive are good.

The "acid value" herein refers to a value measured in accordance with JIS K 0070: 1992.

(Polyisocyanate Compounds (B))

The polyisocyanate compounds (B) that are constituents of the adhesive of the present invention act as curing agents for the polyolefin resin (A) and comprise three types, the polymer of the saturated aliphatic polyisocyanate (B1), the polymer of the saturated alicyclic polyisocyanate (B2), and the polymer of the aromatic polyisocyanate (B3).

By using such three types of polymers as polyisocyanate compounds, a laminate excellent in electrolytic solution resistance and heat resistance can be obtained in the lamination of metal foil and a resin film.

The polyisocyanate compounds (B) may comprise other isocyanate compounds, for example, monomers that are the constituent units of the polymers of (B1) to (B3), in addition to the polymers of (B1) to (B3). In this case, the total content of the polymers of (B1) to (B3) in the polyisocyanate compounds (B) is preferably 80% by mass or more, more preferably 90% by mass or more, further preferably 95% by mass or more, and still further preferably 98% by mass or more from the viewpoint of obtaining a laminate excellent in electrolytic solution resistance in the lamination of metal foil and a resin film, due to these polymers.

Examples of the polymer of the saturated aliphatic polyisocyanate (B1) include polymers of aliphatic diisocyanates such as hexamethylene diisocyanate, 2,4,4-trimethylhexamethylene diisocyanate, and 2,2,4-trimethylhexamethylene diisocyanate. One of these may be used singly, or two or more of these may be used in combination.

Examples of the form of the polymer include an allophanate polymer, an isocyanurate, and a biuret-modified product. Among these, an allophanate polymer and an isocyanurate are preferred, and more preferably an isocyanurate is used.

Examples of the polymer of the saturated alicyclic polyisocyanate (B2) include polymers of saturated alicyclic diisocyanates such as 1,4-cyclohexane diisocyanate, isophorone diisocyanate, methylenebis(4-cyclohexyl isocyanate), 1,3-bis(isocyanatomethyl)cyclohexane, 1,4-bis(isocyanatomethyl)cyclohexane, and norbornane diisocyanate. One of these may be used singly, or two or more of these may be used in combination.

Examples of the form of the polymer include an allophanate polymer, an isocyanurate, and a biuret-modified product. Among these, an allophanate polymer and an isocyanurate are preferred, and more preferably an isocyanurate is used.

Examples of the polymer of the aromatic polyisocyanate (B3) include polymers of aromatic diisocyanates such as 2,4-tolylene diisocyanate, 2,6-tolylene diisocyanate, diphenylmethane-4,4'-diisocyanate (monomeric MDI), 1,3-xylylene diisocyanate, and 1,4-xylylene diisocyanate, and polymethylene polyphenyl polyisocyanate (polymeric MDI). One of these may be used singly, or two or more of these may be used in combination. In the present invention, the "aromatic polyisocyanate" refers to a polyisocyanate having an aromatic ring somewhere in the structural formula.

Examples of the form of the polymer include an allophanate polymer, an isocyanurate, a biuret-modified product, and polymeric MDI. Among these, an allophanate polymer, an isocyanurate, and polymeric MDI are preferred, and polymeric MDI is more preferred. Polymeric MDI is also preferably used as a polymeric MDI mixture comprising monomeric MDI.

For the blending ratio of the polymer of the saturated aliphatic polyisocyanate (B1), the polymer of the saturated alicyclic polyisocyanate (B2), and the polymer of the aromatic polyisocyanate (B3) in the polyisocyanate compounds (B), the molar ratio of the isocyanato groups of the polymers is preferably 3 to 20:1 to 6:1, more preferably 5 to 20:1.5 to 6:1, and further preferably 8 to 12:2 to 4:1.

By setting the blending ratio of the polymers of (B1) to (B3) at such a blending ratio, electrolytic solution resistance and heat resistance can be improved in good balance due to the polymer of the saturated alicyclic polyisocyanate (B2) and the polymer of the aromatic polyisocyanate (B3), while excellent adhesiveness due to the polymer of the saturated aliphatic polyisocyanate (B1) is maintained, in an adhesive layer formed of the adhesive.

The molar ratio of the isocyanato groups of the polyisocyanate compounds (B) to 1 mol of the carboxyl groups of the polyolefin resin (A) (hereinafter described as "NCO/COOH ratio") is preferably 0.3 to 30, more preferably 5 to 25, and further preferably 10 to 20.

When the NCO/COOH ratio is 0.3 or more, the adhesiveness of an adhesive layer formed of the adhesive, particularly adhesiveness to a resin film, is good. Further, when the NCO/COOH ratio is 10 or more, the heat resistance of the adhesive layer is also better. When the NCO/COOH ratio is 30 or less, the adhesiveness of an adhesive layer formed of the adhesive is less likely to decrease even when the adhesive layer comes into contact with an electrolytic solution, which is preferred.

The number of moles of the carboxyl groups of the polyolefin resin (A) can be obtained from the above-described acid value, and the number of moles of the isocyanato groups of the polyisocyanate compounds (B) can be obtained by a method in accordance with JIS K 6806: 2003.

In a case where the NCO/COOH ratio is calculated from the constituent monomers of the polyolefin resin (A), when the polyolefin resin (A) has a carboxy group derived from a carboxylic anhydride, the NCO/COOH ratio is calculated with 1 mol of the carboxylic anhydride considered to correspond to 2 mol of carboxyl groups.

(Metal Carboxylate (C))

The adhesive of the present invention may comprise a metal carboxylate (C) in addition to the polyolefin resin (A) and the polyisocyanate compounds (B).

The metal carboxylate (C) has the action of promoting the reaction of the polyolefin resin (A) and the polyisocyanate compounds (B) and is more preferably blended in the adhesive from the viewpoint of promoting the exhibition of the adhesiveness of an adhesive layer formed of the adhesive.

Examples of the metal carboxylate (C) include metal carboxylates such as metal acetates, metal hexanoates, metal octanoates such as metal 2-ethylhexanoates, metal neodecanoates, metal laurates, metal stearates, and metal oleates; and metal acetylacetonates. The metal of the metal carboxylate (C) is preferably one or more metals selected from the group consisting of groups 7, 12, and 14 of the periodic table. One of these may be used singly, or two or more of these may be used in combination. Among these, carboxylates and an acetylacetonate of any of tin, zinc, and manganese are more preferred from the viewpoint of adhesiveness when an adhesive layer formed of the adhesive comes into contact with an electrolytic solution.

Specific examples include zinc neodecanoate, dibutyltin dilaurate, dioctyltin dilaurate, dioctyltin diacetate, zinc bis(neodecanoate), zinc bis(2-ethylhexanoate), zinc distearate, zinc(II) acetylacetonate, and manganese bis(2-ethylhexanoate). Among these, dibutyltin dilaurate and dioctyltin dilaurate are more preferred from the viewpoint of the balance of the adhesiveness, electrolyte solution resistance, and heat resistance of an adhesive layer formed of the adhesive.

The amount of the metal carboxylate (C) blended in the adhesive is not particularly limited but is preferably 0.0001 to 5 parts by mass, more preferably 0.0005 to 3 parts by mass, and further preferably 0.001 to 1 part by mass, in terms of the metal component, based on 100 parts by mass of the polyolefin resin (A).

When the amount of the metal carboxylate (C) blended is 0.0001 parts by mass or more, better adhesiveness is obtained even when an adhesive layer formed of the adhesive comes into contact with an electrolytic solution. When the amount of the metal carboxylate (C) blended is 5 parts by mass or less, excellent adhesiveness is obtained in the normal state of an adhesive layer formed of the adhesive.

The metal carboxylate (C) may be added to the polyolefin resin (A) during its production or added during the preparation of the adhesive.

<Solvent (D)>

The adhesive of the present invention may comprise a solvent (D) as needed, from the viewpoint of viscosity adjustment, handling properties, and the like. The solvent (D) is not particularly limited as long as the polyolefin resin (A), the polyisocyanate compounds (B), and the metal carboxylate (C) can be dissolved or dispersed. Examples of the solvent (D) include aromatic organic solvents such as toluene and xylene; alicyclic organic solvents such as cyclohexane, methylcyclohexane, and ethylcyclohexane; aliphatic organic solvents such as n-hexane and n-heptane; ester-based organic solvents such as ethyl acetate, propyl acetate, and butyl acetate; ketone-based organic solvents such as acetone, methyl ethyl ketone, and methyl butyl ketone, and in addition mineral spirits. One of these may be used singly, or two or more of these may be used in combination. Among these, from the viewpoint of the solubility of the polyolefin resin (A), toluene, ethyl acetate, propyl acetate, butyl acetate, methylcyclohexane, and methyl ethyl ketone are preferred, and toluene, ethyl acetate, and butyl acetate are more preferred. Mineral spirits may be contained in commercial products of the metal carboxylate (C).

The content of the solvent (D) in the adhesive is preferably 30 to 95% by mass, more preferably 40 to 90% by mass, and further preferably 50 to 90% by mass in 100% by mass of the total of the polyolefin resin (A), the polyisocyanate compounds (B), the metal carboxylate (C), and the solvent (D).

When the content is 30% by mass or more, the coating properties of the adhesive are good. When the content is 95% by mass or less, the thickness controllability of a laminate laminated using the adhesive is good.

(Additive)

The adhesive of the present invention may comprise any additive as needed, in addition to the polyolefin resin (A), the polyisocyanate compounds (B), the metal carboxylate (C), and the solvent (D), within a range that does not impair the effects of the present invention. Examples of the additive include a reaction accelerator, a tackifier, and a plasticizer. One of these may be used singly, or two or more of these may be used in combination.

When the adhesive comprises an additive, the total content of the polyolefin resin (A), the polyisocyanate compounds (B), the metal carboxylate (C), and the solvent (D) is preferably 80% by mass or more, more preferably 90% by mass or more, further preferably 95% by mass or more, and still further preferably 98% by mass or more from the viewpoint of sufficiently exhibiting the action of the components of these (A) to (D) in the adhesive.

Examples of the reaction accelerator include tertiary amines such as 2,4,6-tris(climethylaminomethyl)phenol, N,N-dimethylaniline, N,N-dimethyl-p-toluidine, and p-tolyldiethanolamine, as compounds having a function similar to that of the metal carboxylate (C). One of these may be used singly, or two or more of these may be used in combination. This reaction accelerator may be used instead of the metal carboxylate (C) or in combination with the metal carboxylate (C).

The tackifier is not particularly limited. Examples of the tackifier include natural ones such as polyterpene-based resins and rosin-based resins; and petroleum-based ones such as aliphatic (C5) resins, aromatic (C9) resins, copolymerized resins of C5 and C9, and alicyclic resins that are fractions produced as by-products by the thermal cracking of naphtha. Examples of the tackifier also include hydrogenated resins obtained by hydrogenating the double bond moieties of these resins. One of these may be used singly, or two or more of these may be used in combination.

The plasticizer is not particularly limited either, and one plasticizer may be used singly, or two or more plasticizers may be used in combination. Examples of the plasticizer include liquid rubbers such as polyisoprene and polybutene; process oils, polyolefin resins other than the polyolefin resin (A), other thermoplastic resins, and thermoplastic elastomers. Examples of the thermoplastic resins and the thermoplastic elastomers include ethylene-vinyl acetate copolymerized resins, ethylene-ethyl acrylate copolymerized resins, styrene-ethylene-butylene-styrene (SEBS) copolymerized resins, and styrene-ethylene-propylene-styrene (SEPS) copolymerized resins.

[Laminate]

The laminate of the present invention is one in which metal foil and a resin film are laminated using the adhesive. In other words, metal foil and a resin film are adhered to each other with the adhesive, and an adhesive layer formed of the adhesive is in contact with the adhesion surfaces of both the metal foil and the resin film.

Other adhesives other than the adhesive may be used for the adhesion of metal foil to each other, the adhesion of resin films to each other, and the like, that is, adhesion other than adhesion between metal foil and a resin film, but the adhesive can also exhibit good adhesiveness in adhesion between these.

As the method of the lamination, known methods such as a heat lamination method and a dry lamination method can be used.

The heat lamination method is a method of heating and melting an adhesive not comprising the solvent (D) on the adhesion surface of an adherend, or heating and extruding the adhesive together with an adherend, and thus the adhesive is interposed between metal foil and a resin film to form an adhesive layer.

On the other hand, the dry lamination method is a method of applying an adhesive comprising the solvent (D) to the adhesion surface of an adherend, drying it, and then performing pressure bonding with the adhesion surface of the adherend superimposed on the adhesion surface of the other adherend, and thus the adhesive is interposed between metal foil and a resin film to form an adhesive layer.

For the metal foil, generally, aluminum foil such as pure aluminum-based or aluminum-iron-based alloy O materials (soft materials) is used, and such aluminum foil is preferably used.

The thickness of the metal foil is preferably 10 to 100 µm, more preferably 30 to 50 µm, further preferably 35 to 50 µm, and still further preferably 40 to 50 µm from the viewpoint of processability, and barrier properties for preventing the permeation of oxygen and water through the laminate.

When the thickness is 10 µm or more, the breakage of the metal foil during shaping, and the permeation of oxygen and water through the laminate due to the occurrence of pinholes can be sufficiently suppressed. When the thickness is 100 µm or less, the total thickness and mass of the laminate, and the like are easily moderately adjusted.

The metal foil is preferably subjected to undercoating treatment with a silane coupling agent, a titanium coupling agent, or the like; and chemical conversion treatment such as chromate treatment for the improvement of adhesiveness to the resin film, corrosion resistance improvement, and the like.

The material of the resin film is preferably a heat-sealable resin from the viewpoint of having heat sealability and obtaining excellent electrolytic solution resistance. Examples of the material include polypropylene, polyethylene, maleic acid-modified polypropylene, ethylene-acrylate copolymers, and ionomer resins. The resin film may be a single layer and may be composed of a plurality of layers by coextrusion or the like. In the case of a plurality of layers, the materials of the layers may be the same, or different for each layer.

The thickness of the resin film is preferably 9 to 100 µm, more preferably 20 to 90 µm, and further preferably 40 to 80 µm.

When the thickness is 9 µm or more, sufficient adhesiveness to the metal foil is obtained by lamination, and the strength of the film itself is also sufficient, and excellent electrolytic solution resistance is obtained. When the thickness is 100 µm or less, good shapability is obtained.

The use of the laminate is not particularly limited, and, for example, the laminate can be preferably used as a packaging material. Examples of the material to be packaged include liquid materials comprising acids, alkalis, organic solvents, and the like. Specific examples include putties such as thick putties and thin putties; paints such as oil paints; lacquers such as clear lacquers; solvent-based automobile compounds; and the electrolytic solutions of secondary batteries such as lithium ion batteries.

[Battery Exterior Material]

The laminate can be preferably used for a battery exterior material. As described above, the laminate is excellent in electrolytic solution resistance for the electrolytic solutions of secondary batteries such as lithium ion batteries, and therefore the battery exterior material is a preferred use of the laminated material.

The battery exterior material is preferably a laminate having a configuration in which a resin film is provided on the outside surface of metal foil. The battery exterior material may have a configuration in which it has an intermediate resin layer, an outer layer, and further a coating layer and the like, in addition to the layer configuration of the laminate, as needed, from the viewpoint of further improving mechanical strength, electrolytic solution resistance, and the like. Examples of the configuration include the layer configurations as shown in the following (1) to (4). In the following illustration, adhesive layer refers to a layer formed of the adhesive of the present invention.

(1) outer layer/metal foil/adhesive layer/resin film
(2) outer layer/intermediate resin layer/metal foil/adhesive layer/resin film
(3) coating layer/outer layer/metal foil/adhesive layer/resin film
(4) coating layer/outer layer/intermediate resin layer/metal foil/adhesive layer/resin film The outer layer is usually formed of a resin film, and from the viewpoint of heat resistance, shapability, insulating properties, and the like, for example, a stretched film of a polyamide (nylon) resin, a polyester resin, or the like is preferably used.

The thickness of the outer layer is preferably 9 to 50 µm, more preferably 10 to 40 µm, and further preferably 20 to 30 µm.

When the thickness is 9 µm or more, the elongation of the resin film during the shaping of the battery exterior material is sufficiently ensured, and the necking of the metal foil is suppressed, and the shapability is good. Considering cost, sufficient heat resistance and insulating properties are obtained with a thickness of 50 µm or less.

When the resin film used for the outer layer is a stretched film, the tensile strength is preferably 150 N/mm$^2$ or more, more preferably 200 N/mm$^2$ or more, and further preferably 250 N/mm$^2$ or more in all three directions of 0°, 45°, and 90° to the stretching direction from the viewpoint of obtaining better shapability. The elongation to break is preferably 80% or more, more preferably 100% or more, and further preferably 120% or more.

The "tensile strength" and the "elongation to break" as referred to herein are the values of strength and elongation when a sample film 150 mm long by 15 mm wide by 9 to 50 µm thick is cut with the stretching direction for the three directions being the length direction, a tensile test is performed at a tensile speed of 100 mm/min, and the sample film breaks.

Examples of the material of the intermediate resin layer in the above layer configurations (2) and (4) include polyamide resins, polyester resins, and polyethylene resins from the viewpoint of the improvement of the mechanical strength of the battery exterior material. The intermediate resin layer may be a single-layer resin film or may be a multilayer coextruded resin film or the like. The thickness of the intermediate resin layer is not particularly limited but is usually about 0.1 to 30 µm.

The coating layer in the above layer configurations (3) and (4) is usually provided from the viewpoint of providing gas barrier properties against water vapor and other gases and can be formed of a known material. For example, the coating layer can be formed by applying a polymer having gas barrier properties, or vapor-depositing or applying a metal such as aluminum, or an inorganic oxide such as silicon oxide or aluminum oxide.

[Battery Case]

The battery exterior material is excellent in electrolytic solution resistance, heat resistance, gas barrier properties, and the like and therefore can be preferably used as the battery case of a secondary battery, particularly a lithium ion battery.

In addition, the battery exterior material is excellent in shapability, and therefore a battery case can be simply produced by shaping by a known method. The shaping method is not particularly limited, but the battery exterior material is preferably shaped by deep drawing or bulging from the viewpoint of addressing a complicated shape and high dimensional accuracy.

propylene-ethylene random copolymers having different MFR values as shown in the following Table 1 were used.

Synthesis Examples 6 to 8

The polyolefin resins (A6) to (A8) were obtained as in Synthesis Example 1 except that in Synthesis Example 1, the propylene-butene random copolymer (A6), the propylene polymer (A7), or the propylene-ethylene-butene random copolymer (A8) as shown in the following Table 1 was used instead of the propylene-ethylene random copolymer.

For the polyolefin resins (A) synthesized above, the acid value and the MFR were measured as follows. The measurement results of these are shown together in Table 1.

<Acid Value>

The acid value was obtained by performing neutralization titration with a potassium hydroxide ethanol solution in accordance with JIS K 0070: 1992.

<MFR Measurement>

The MFR was measured under the conditions of a temperature of 130° C. and a load of 2.16 kg in accordance with JIS K 7210-1: 2014.

TABLE 1

| Synthesis Example | | 1 | 2 | 3 | 4 | 5 | 6 | 7 | 8 |
|---|---|---|---|---|---|---|---|---|---|
| Polyolefin Resin (A) Raw material polyolefin | | (A1) | (A2) | (A3) | (A4) | (A5) | (A6) | (A7) | (A8) |
| Propylene-ethylene random copolymer | Monomer molar ratio | 97:3 | 97:3 | 97:3 | 97:3 | 97:3 | | | |
| | MFR [g/10 min] | 10 | 5 | 36 | 1 | 42 | | | |
| Propylene-butene random copolymer | Monomer molar ratio | | | | | | 97:3 | | |
| | MFR [g/10 min] | | | | | | 37 | | |
| Propylene polymer | MFR [g/10 min] | | | | | | | 8 | |
| Propylene-ethylene-butene random copolymer | Monomer molar ratio | | | | | | | | 95:3:2 |
| | MFR [g/10 min] | | | | | | | | 10 |
| Acid value [mgKOH/g] | | 5.7 | 5.7 | 5.7 | 5.7 | 5.7 | 5.7 | 5.7 | 5.7 |
| MFR [g/10 min] | | 12 | 8 | 40 | 3 | 45 | 40 | 11 | 11 |

EXAMPLES

The present invention will be described in detail below by Examples, but the present invention is not limited by these.

Synthesis of Polyolefin Resins (A)

The polyolefin resins (A1) to (A8) shown in the following Table 1 were produced by the following Synthesis Examples 1 to 8 respectively.

Synthesis Example 1

100 Parts by mass of a propylene-ethylene random copolymer (propylene-ethylene molar ratio 97:3, MFR 10 g/10 min) produced using a metallocene catalyst as a polymerization catalyst, 0.5 parts by mass of maleic anhydride, 1 part by mass of lauryl methacrylate, and 1.5 parts by mass of di-t-butyl peroxide were kneaded and reacted using a twin-screw extruder with the highest temperature of the cylinder portion set at 170° C. Then, the extruder was degassed under reduced pressure, and the unreacted residues were removed to obtain the polyolefin resin (A1) having a carboxyl group.

Synthesis Examples 2 to 5

The polyolefin resins (A2) to (A5) were obtained as in Synthesis Example 1 except that in Synthesis Example 1, the

[Preparation of Adhesives]

Adhesives for the lamination of metal foil and a resin film were prepared as follows. The compounds blended in the adhesives are shown below.

<Polyolefin Resin (A)>

Polyolefin resins (A1) to (A8) produced in the above Synthesis Examples 1 to 8

<Polyisocyanate Compounds (B)>

(B1) isocyanurate of hexamethylene diisocyanate: "Duranate (registered trademark) TKA-100", manufactured by Asahi Kasei Corporation; isocyanato group content 21.7% by mass (B2) isocyanurate of isophorone diisocyanate: "Desmodur (registered trademark) Z 4470 BA", manufactured by Covestro; butyl acetate solution (concentration 70% by mass); isocyanato group content 8.3% by mass (B3) polymeric MDI: "Sumidur (registered trademark) 44V40", manufactured by Covestro; mixture with monomeric MDI (monomeric MDI content 32.0% by mass); isocyanato group content 30.0% by mass <Metal Carboxylate (C)>

(C1) zinc neodecanoate: "BiCAT (registered trademark) Z (M)", manufactured by The Shepherd Chemical Company, metal (zinc) content 19% by mass (C2) dibutyltin dilaurate: "KS-1260", manufactured by Sakai Chemical Industry Co., Ltd.

(C3) zinc bis(2-ethylhexanoate): "Hexoate Zinc 15%", manufactured by TOEI CHEMICAL INDUSTRY CO., LTD.; mineral spirit solution (concentration 65% by mass); metal (zinc content 15% by mass)

(C4) zinc distearate: "AFCO-CHEM ZNS-P", manufactured by ADEKA Corporation (C5) zinc(II) acetylacetonates reagent, manufactured by TOKYO CHEMICAL INDUSTRY CO., LTD.

(C6) manganese bis(2-ethylhexanoate): "Hexoate Manganese 6%", manufactured by TOEI CHEMICAL INDUSTRY CO., LTD., mineral spirit solution (concentration 42% by mass); metal (manganese content 6% by mass)

<Solvent (D)>

Toluene-ethyl acetate mixed solvent (mixing mass ratio 9:1)

Example 1

15.00 g of the polyolefin resin (A1) was dissolved in 85.0 g of the solvent (D). Then, 2.96 g of (B1), 2.29 g of (B2), and 0.21 g of (B3) were added as the polyisocyanate compounds (B), and the mixture was stirred and mixed to prepare an adhesive for the lamination of metal foil and a resin film.

Examples 2 to 8

Adhesives were prepared as in Example 1 except that in Example 1, (A2) to (A8) were respectively used instead of the polyolefin resin (A1).

Examples 9 to 13

Adhesives were prepared as in Example 6 except that in Example 6, the metal carboxylates (C1) to (C5) were respectively further added in an amount of 0.02 parts by mass as raw materials.

Comparative Examples 1 to 6

Adhesives were prepared as in Example 6 except that in Example 6, the blending composition of the polyisocyanate compounds (B) was changed as shown in the following Table 3.

For the adhesives prepared in the above Examples and Comparative Examples, the NCO/COOH ratio was obtained as follows.

In the above Examples and Comparative Examples, the blending compositions of the polyolefin resin (A) and the polyisocyanate compounds (B) were adjusted so that the NCO/COOH ratio was 14.0 in all.

<NCO/COOH Ratio>

The amount of NCO in the polyisocyanate compounds (B) was obtained by a method in accordance with JIS K 6806: 2003, and the number of moles of isocyanato groups was calculated.

The number of moles of carboxyl groups in the polyolefin resin (A) was calculated from the acid value of the polyolefin resin (A) obtained above.

Then, the number of moles of isocyanato groups was divided by the number of moles of carboxyl groups to obtain the NCO/COOH ratio.

[Production of Battery Exterior Materials]

Battery exterior materials having a layer configuration of outer layer/intermediate resin layer/aluminum foil/adhesive layer/resin film were produced by a dry lamination method using the adhesives of the above Examples and Comparative Examples. The aging and drying conditions after lamination were a temperature of 40° C., a humidity of 5% RH, and 5 days.

The materials of the layers of the battery exterior materials are as follows.

<Outer Layer>

Polyethylene terephthalate/stretched polyamide laminated film; thickness 27 μm; tensile strength 270 N/mm² and elongation to break 150% in all three directions of 0°, 45°, and 90° to the stretching direction <Intermediate Resin Layer>

Urethane-based adhesive for dry lamination: "AD-502/CAT10L", manufactured by Toyo-Morton, Ltd.; coating amount 3 g/m² (at the time of application)

<Aluminum Foil>

Aluminum foil of aluminum-iron-based alloy: AA standard 8079-O material; thickness 40 μm <Adhesive Layer>

Adhesives prepared in the above Examples and Comparative Examples; coating amount: thickness after drying 2 μm <Resin Film>

Unstretched polypropylene film; thickness 80 μm

[Evaluation of Battery Exterior Materials]

For the battery exterior materials produced above, the evaluation of adhesiveness, electrolytic solution resistance, and heat resistance was performed by a T-peel strength test under the conditions shown below. The evaluation results of these are shown together in Tables 2 and 3.

<T-Peel Strength Test>

Measurement sample: a test piece cut from the battery exterior material into a size 150 mm long by 15 mm wide Measuring apparatus: precision universal tester; "Autograph AG-X", manufactured by SHIMADZU CORPORATION Peeling site: between the aluminum foil and resin film of the measurement sample Peeling speed: 100 mm/min (1) Adhesiveness The adhesiveness was evaluated by the normal state T-peel strength between the aluminum foil and the resin film measured at a temperature of 23° C. and a humidity of 50% RH (normal state).

(2) Electrolytic Solution Resistance

The measurement sample was immersed in an electrolytic solution solvent (propylene carbonate/diethyl carbonate mixed liquid; mixing mass ratio 50:50), allowed to stand under an 85° C. atmosphere for 1 day, and then removed, and the T-peel strength between the aluminum foil and the resin film after immersion was measured as in the above (1). The electrolytic solution resistance was evaluated by this T-peel strength.

(3) Heat Resistance

The measurement sample was allowed to stand under an 85° C. atmosphere for 3 minutes. After it was confirmed that the measurement sample surface reached 85° C., the high temperature (85° C.) T-peel strength between the aluminum foil and the resin film was measured as in the above (1). The heat resistance was evaluated by this T-peel strength.

TABLE 2

| Blending composition [g] | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Polyolefin Resin (A) | | (A1) | (A2) | (A3) | (A4) | (A5) | (A6) | (A7) | (A8) | (A6) | (A6) | (A6) | (A6) | (A6) |
| | | 15.00 | 15.00 | 15.00 | 15.00 | 15.00 | 15.00 | 15.00 | 15.00 | 15.00 | 15.00 | 15.00 | 15.00 | 15.00 |
| Polyisocyanate | (B1) | 2.96 | 2.96 | 2.96 | 2.96 | 2.96 | 2.96 | 2.96 | 2.96 | 2.96 | 2.96 | 2.96 | 2.96 | 2.96 |
| compounds (B) | (B2) | 2.29 | 2.29 | 2.29 | 2.29 | 2.29 | 2.29 | 2.29 | 2.29 | 2.29 | 2.29 | 2.29 | 2.29 | 2.29 |
| | (B3) | 0.21 | 0.21 | 0.21 | 0.21 | 0.21 | 0.21 | 0.21 | 0.21 | 0.21 | 0.21 | 0.21 | 0.21 | 0.21 |
| Metal carboxylate (C) | | — | — | — | — | — | — | — | — | (C1) | (C2) | (C3) | (C4) | (C5) |
| | | | | | | | | | | 0.02 | 0.02 | 0.02 | 0.02 | 0.02 |
| Solvent (D) | | 85.00 | 85.00 | 85.00 | 85.00 | 85.00 | 85.00 | 85.00 | 85.00 | 85.00 | 85.00 | 85.00 | 85.00 | 85.00 |
| NCO/COOH ratio | | 14.0 | 14.0 | 14.0 | 14.0 | 14.0 | 14.0 | 14.0 | 14.0 | 14.0 | 14.0 | 14.0 | 14.0 | 14.0 |
| (C) component based on 100 parts by mass of (A) component [parts by mass] | | 0 | 0 | 0 | 0 | 0 | 0 | 0 | 0 | 0.14 | 0.14 | 0.14 | 0.14 | 0.14 |
| T-peel strength [N/15 mm] | Normal State | 22.5 | 23.1 | 22.0 | 19.6 | 23.0 | 22.4 | 22.4 | 22.8 | 21.8 | 23.6 | 22.5 | 22.9 | 22.9 |
| | After immersion | 13.0 | 14.8 | 13.8 | 11.0 | 13.8 | 14.0 | 13.9 | 14.0 | 14.5 | 15.2 | 14.5 | 14.4 | 14.8 |
| | 85° C. | 8.0 | 7.9 | 7.4 | 6.9 | 7.8 | 8.0 | 8.0 | 7.5 | 7.2 | 8.0 | 7.6 | 8.0 | 7.5 |

TABLE 3

| Blending composition [g] | | Comparative Example | | | | | |
|---|---|---|---|---|---|---|---|
| | | 1 | 2 | 3 | 4 | 5 | 6 |
| Polyolefin Resin (A) | | (A6) | (A6) | (A6) | (A6) | (A6) | (A6) |
| | | 15.00 | 15.00 | 15.00 | 15.00 | 15.00 | 15.00 |
| Polyisocyanate | (B1) | 3.21 | — | — | 1.61 | — | 1.61 |
| compounds (B) | (B2) | — | 10.69 | — | 5.35 | 5.35 | — |
| | (B3) | — | — | 2.94 | — | 1.47 | 1.47 |
| Solvent (D) | | 85.00 | 85.00 | 85.00 | 85.00 | 85.00 | 85.00 |
| NCO/COOH ratio | | 14.0 | 14.0 | 14.0 | 14.0 | 14.0 | 14.0 |
| T-peel strength [N/15mm] | Normal state | 23.0 | 9.6 | 3.1 | 19.8 | 11.1 | 18.9 |
| | After immersion | 7.8 | 2.0 | 1.6 | 7.8 | 1.6 | 8.2 |
| | 85° C. | 5.0 | 3.0 | 1.2 | 5.0 | 2.6 | 4.9 |

As seen from the comparison of the results shown in Tables 2 and 3, it was noted that according to the adhesives (Examples 1 to 13) using the three predetermined types as the polyisocyanate compounds (B), laminates in which all of the T-peel strengths were sufficiently high, good adhesiveness was obtained, and the electrolytic solution resistance and the heat resistance were also excellent were obtained.

On the other hand, with the adhesives (Comparative Examples 1 to 6) using only any one or two of the three types as the polyisocyanate compounds (B), some or all of the normal state T-peel strength, the T-peel strength after electrolytic solution solvent immersion, and the high temperature (85° C.) T-peel strength could not be said to be sufficient, and none were excellent in all effects of the above adhesiveness, electrolytic solution resistance, and heat resistance.

The invention claimed is:

1. An adhesive for lamination of metal foil and a resin film, comprising:
    a polyolefin resin (A) having a carboxyl group; and
    polyisocyanate compounds (B), wherein
    the polyolefin resin (A) comprises one or more monomer units selected from the group consisting of propylene, ethylene, and butene,
    wherein the polyisocyanate compounds (B) comprise an isocyanurate of a saturated aliphatic polyisocyanate, an isocyanurate of a saturated alicyclic polyisocyanate, and polymethylene polyphenyl polyisocyanate,
    wherein a molar ratio of isocyanato groups of the polyisocyanate compounds (B) to 1 mol of the carboxyl groups of the polyolefin resin (A) is 10 to 20.

2. The adhesive according to claim 1, wherein a molar ratio of isocyanato groups of the isocyanurate of the saturated aliphatic polyisocyanate, the isocyanurate of the saturated alicyclic polyisocyanate, and the polymethylene polyphenyl polyisocyanate is 3 to 20:1 to 6:1.

3. The adhesive according to claim 1, wherein the polyolefin resin (A) comprises propylene as a monomer unit.

4. The adhesive according to claim 1, wherein the polyolefin resin (A) comprises a polyolefin resin modified with one or more selected from the group consisting of an ethylenic unsaturated carboxylic acid or an acid anhydride thereof.

5. The adhesive according to claim 1, wherein the polyolefin resin (A) has a melt mass-flow rate of 2 to 50 g/10 min measured at a temperature of 130° C. and a load of 2.16 kg in accordance with JIS K 7210-1: 2014.

6. The adhesive according to claim 1, wherein a molar ratio of isocyanato groups of the polyisocyanate compounds (B) to 1 mol of the carboxyl groups of the polyolefin resin (A) is 14.0 to 20.

7. The adhesive according to claim 1, further comprising a metal carboxylate (C).

8. A laminate wherein metal foil and a resin film are laminated using the adhesive according to claim 1.

9. The laminate according to claim 8, wherein the metal foil is aluminum foil, and the resin film is a heat-sealable resin film.

10. The laminate according to claim 8, wherein a thickness of the metal foil is 10 to 100 μm, and a thickness of the resin film is 9 to 100 μm.

11. A battery exterior material wherein the laminate according to claim 8 is used.

12. A battery case wherein the battery exterior material according to claim 11 is used.

13. The adhesive according to claim 1, wherein the isocyanurate of the saturated aliphatic polyisocyanate is an isocyanurate of a saturated aliphatic diisocyanate, and the isocyanurate of the saturated alicyclic polyisocyanate is an isocyanurate of a saturated alicyclic diisocyanate.

14. The adhesive according to claim 13, wherein the isocyanurate of the saturated aliphatic diisocyanate is an isocyanurate of hexamethylene diisocyanate, and the isocyanurate of the saturated alicyclic diisocyanate is an isocyanurate of isophorone diisocyanate.

15. A method for producing a battery case, comprising a step of shaping the battery exterior material according to claim 11 by deep drawing or bulging.

* * * * *